US010803786B2

(12) United States Patent
Yoon et al.

(10) Patent No.: US 10,803,786 B2
(45) Date of Patent: Oct. 13, 2020

(54) DISPLAY MODULE AND DISPLAY APPARATUS WITH A FRAME

(71) Applicant: SAMSUNG ELECTRONICS CO., LTD., Suwon-si (KR)

(72) Inventors: Sang Ki Yoon, Suwon-si (KR); Kwang Sung Hwang, Suwon-si (KR); Huu Lam Vuong Nguyen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/007,723

(22) Filed: Jun. 13, 2018

(65) Prior Publication Data

US 2019/0180673 A1 Jun. 13, 2019

(30) Foreign Application Priority Data

Dec. 12, 2017 (KR) .......................... 10-2017-0170214

(51) Int. Cl.
*H05K 5/00* (2006.01)
*G09G 3/32* (2016.01)
(Continued)

(52) U.S. Cl.
CPC ............. *G09G 3/32* (2013.01); *G06F 3/1446* (2013.01); *G09F 9/3026* (2013.01); *H05K 5/0017* (2013.01); *G09G 2310/0264* (2013.01)

(58) Field of Classification Search
CPC .......... G09F 9/3026; G09F 9/33; G09F 19/22; G09F 19/226; G06F 3/1446;
(Continued)

(56) References Cited

U.S. PATENT DOCUMENTS 5,949,581 A * 9/1999 Kurtenbach .............. G09F 9/33
359/619
2014/0078685 A1* 3/2014 Lee ..................... H05K 5/0017
361/730
(Continued)

FOREIGN PATENT DOCUMENTS

CN 106448479 A * 2/2017
CN 106448479 A 2/2017
(Continued)

OTHER PUBLICATIONS

Communication dated Oct. 22, 2018 issued by the Korean Intellectual Property Office in counterpart Korean Application No. 10-2017-0170214.
(Continued)

*Primary Examiner* — James Wu
(74) *Attorney, Agent, or Firm* — Sughrue Mion, PLLC

(57) ABSTRACT

A display apparatus includes a display module configured to be installed to a support in front of the support and a circuit part configured to be approachable in front of the display module. The display module includes: a frame including a first coupling member; a bracket including a second coupling member and detachably mounted to the frame; a circuit part detachably mounted to the bracket; and a light emitting diode (LED) module including a plurality of third coupling members coupled with or separated from the first coupling member and the second coupling member by a magnetic force. The bracket and the circuit part is configured to be mounted to the frame in front of the frame or to be separated from the frame in front of the frame.

17 Claims, 14 Drawing Sheets

(51) Int. Cl.
  *G06F 3/14* (2006.01)
  *G09F 9/302* (2006.01)
(58) Field of Classification Search
  CPC ..... H05K 5/0017; Y10T 292/11; Y10T 24/32; Y10T 70/7057; Y10T 70/7904; G09G 2300/026; G09G 2310/0264; G09G 3/32
  See application file for complete search history.

(56) References Cited

U.S. PATENT DOCUMENTS

| | | | | |
|---|---|---|---|---|
| 2017/0006727 | A1* | 1/2017 | Ryu | H01L 25/0753 |
| 2017/0105293 | A1* | 4/2017 | Kim | H05K 5/0017 |

FOREIGN PATENT DOCUMENTS

| | | | |
|---|---|---|---|
| CN | 106463083 A | | 2/2017 |
| JP | 2015-045697 A | | 3/2015 |
| KR | 10-2012-0058055 A | | 6/2012 |
| KR | 20120058055 A | * | 6/2012 |
| KR | 10-2015-0011581 A | | 2/2015 |
| KR | 10-2015-0098027 A | | 8/2015 |
| KR | 10-2017-0000575 A | | 1/2017 |
| KR | 10-1705510 B1 | | 2/2017 |
| KR | 10-1748550 B1 | | 6/2017 |
| WO | 2016/109439 A1 | | 7/2016 |

OTHER PUBLICATIONS

Communication dated Dec. 14, 2018 issued by the European Intellectual Property Office in counterpart European Application No. 18177047.0.
Communication dated Jul. 31, 2018, issued by the Korean Intellectual Property Office in counterpart Korean Patent Application No. 10-2017-0170214.
Search Report dated Oct. 12, 2018, issued by the International Searching Authority in counterpart International Patent Application No. PCT/KR2018/006780 (PCT/ISA/210).
Anonymous, "Releasing Smart signage with Taizen OS 3.0 in InfoCom 2017", Dec. 2012, Samsung Newsroom, 25 pages total, https://news.samsung.com/kr/?p=341927.
Communication dated Oct. 11, 2019 issued by the State Intellectual Property Office in CN Application No. 201811472820.5.
Communication dated Mar. 16, 2020 issued by the State Intellectual Property Office of P.R. China in counterpart Chinese Application No. 201811472820.5.

* cited by examiner

DISPLAY MODULE AND DISPLAY APPARATUS WITH A FRAME

CROSS-REFERENCE TO RELATED APPLICATION

This application is based on and claims priority under 35 U.S.C. § 119 to Korean Patent Application No. 10-2017-0170214, filed on Dec. 12, 2017, in the Korean Intellectual Property Office, the disclosure of which is incorporated by reference herein in its entirety.

BACKGROUND

1. Field

The disclosure relates to a display module and a display apparatus including the same, and more particularly, to a display module having a circuit portion configured to be accessible from the front of the display module and a display apparatus including the same.

2. Discussion of Related Art

A display apparatus including a plurality of LEDs has excellent brightness and color characteristics compared with other types of display apparatuses (e.g., a liquid crystal display (LCD) device), and is thus often used for indoor/outdoor billboards, indoor/outdoor signboards in sports stadiums, electronic scoreboards, or indoor/outdoor backdrops. Further, the LED display apparatus may be easily expanded by arranging the plurality of LEDs in the form of M×N (M, N are integers) matrix. A display apparatus implemented in the form of the M×N matrix may be provided with M×N display modules supported on a support.

With increasing demands for a display apparatus implemented in the form of the M×N matrix, there is an increasing need for a display apparatus which offers easy installation and improved space usability.

When the M×N display modules are mounted on the support, the installation work may be performed behind the support. At this time, a space for installation work is required behind the support body. When installing a display apparatus that is implemented in M×N display modules adjacent to the wall, space usability may be reduced due to the required working space behind the support.

When a circuit part disposed inside the display module is broken, it may be required to separate the circuit part from the rear of the display module. At this time, a working space for separating the circuit part is required behind the display module. As in the case of installing the display module at the rear of the support, the space usability may be reduced due to the required working space behind the display module.

Also, if it is not possible to access the circuit part in front of the display module when at least one of the circuit parts of the M×N display modules is broken, much time and effort is required to find the display module in which the failure occurred. As for the display apparatus implemented in the M×N matrix form, it is possible to recognize the position of the failed display module from the front side of the display apparatus but it is difficult to recognize the position of the broken display module from the rear side of the display apparatus.

SUMMARY

Therefore, it is an aspect of the present disclosure to provide a display apparatus including a display module configured to be installed to or separated from a support in front of the support.

It is another aspect of the present disclosure to provide a display module having a circuit part configured to be approachable in front of the display module and a display apparatus having the same.

It is another aspect of the present disclosure to provide a display apparatus capable of mitigating an impact due to contact between display modules when a plurality of display modules are installed to a support.

It is another aspect of the present disclosure to provide a display apparatus capable of installing a display module to a support while an LED module is mounted on the display module.

It is another aspect of the present disclosure to provide a display apparatus in which an additional coupling member is not required when a display module is installed to a support, thereby facilitating installation.

It is another aspect of the present disclosure to provide a display apparatus with improved space usability.

Several embodiments will be set forth in part in the description which follows and, in part, will be obvious from the description, or may be learned by practice of the disclosure.

In accordance with an embodiment, a display module may include: a frame including a first coupling member; a bracket including a second coupling member, the bracket being detachably mounted to the frame; a circuit part detachably mounted to the bracket; and a light emitting diode (LED) module including a plurality of third coupling members detachably coupled with the first coupling member and the second coupling member by a magnetic force. The bracket and the circuit part are configured to be mounted to the frame in front of the frame or to be separated from the frame in front of the frame.

One of the plurality of third coupling members may be detachably coupled to the first coupling member, and another of the plurality of third coupling members, may be detachably coupled to the second coupling member.

The circuit part may include a control board configured to provide a driving signal to drive the LED module and a power supply configured to supply power to the LED module.

The control board and the power supply may be integrally provided.

The display module may further include a cover plate mounted to the frame to cover a first area of the rear surface of the frame. The cover plate may be detachably mounted to the frame.

The cover plate may be mounted to the frame by moving the cover plate into the frame, from a front of the frame, or may be separated from the frame by moving the cover plate out of the frame, at the front of the frame.

The display module may further include a cover frame mounted to the rear surface of the frame to cover a second area which is not overlapped with the first area. The cover frame may form a receiving space in which the circuit part is received.

The cover plate may include a plurality of through holes or a plurality of slits passing through the cover plate.

The first coupling member may include a magnet, the second coupling member may include a magnet, and the third coupling member may include a magnetizable material.

The third coupling member may be configured to be magnetized to the N pole or S pole. A distance between the third coupling member and the first coupling member and a distance between the third coupling member and the second coupling member may change according to the polarity of the third coupling member.

The display module may further include a support including a coupling hole extending in an oblique direction and configured to support the frame. The frame may further include a coupling protrusion configured to be inserted into the coupling hole.

The coupling protrusion may include: a flange disposed to be in contact with a first surface of the support; and a moving part disposed to be in contact with a second surface opposite to the first surface of the support and configured to be reciprocally movable within a predetermined range.

The coupling protrusion may further include an elastic member disposed between the flange and the moving part. When the coupling protrusion is inserted into the coupling hole, the elastic member may provide an elastic force to the moving part so that the moving part moves toward the second surface.

In accordance with another embodiment, a display module includes: a frame including a first coupling member; a bracket, including a second coupling member, configured to be detachably mounted to the frame; a circuit part configured to be detachably mounted to a first surface of the bracket; and a light emitting diode (LED) module configured to be detachably mounted to a second surface of the bracket, opposite to the first surface of the bracket, and including a plurality of third coupling members. One of the plurality of the third coupling members may be coupled to the first coupling member by a magnetic force. Another of the plurality of the third coupling members, may be coupled to the second coupling member by a magnetic force.

The bracket and the circuit part may be disposed to be accessible from the front of the frame.

In accordance with another embodiment, a display apparatus including a plurality of display modules and a support to support the plurality of display modules. Each of the display modules includes: a frame; a light emitting diode (LED) module configured to be detachably mounted to the frame; and a coupling protrusion configured to be coupled to the frame. The support includes a coupling hole extending in an oblique direction so that the coupling protrusion is inserted into the coupling hole in an oblique direction.

The display module may be configured to be coupled to the support or be separated from the support while the LED module is mounted to the frame.

The coupling protrusion may include: a flange disposed to be in contact with a first surface of the support; and a moving part disposed to be in contact with a second surface opposite to the first surface of the support and configured to be reciprocally movable within a predetermined range.

The coupling protrusion may further include an elastic member disposed between the flange and the moving part. When the coupling protrusion is inserted into the coupling hole, the elastic member may provide an elastic force to the moving part so that the moving part moves toward the second surface.

The moving part may include a guide surface that is inclined to guide the coupling protrusion while the coupling protrusion is inserted in to the coupling hole.

In accordance with another embodiment, a display module may include: a light emitting diode (LED) module configured to emit light in a forward direction, the LED module including a plurality of third coupling members; a bracket including a second coupling member; and a frame configured to be coupled to a support such that the frame is disposed in the forward direction relative to the support, The second coupling member may be configured to detachably couple with at least one of the plurality of third coupling members such that the LED module separates from the bracket in the forward direction, and the bracket may be detachably mounted to the frame such that the bracket separates from the frame in the forward direction. The second coupling member may include a second magnetic material and the third coupling members configured to detachably couple with the second coupling member may include a third magnetic material.

The frame may include a first coupling member configured to detachably couple with at least another of the third coupling members such that the LED module separates from the frame in the forward direction, the first coupling member may include a first magnetic material.

The display module of may include a circuit part, and the bracket may also include a front surface of the bracket; and a back surface of the bracket, with the front surface of the bracket is disposed in the forward direction, relative to the back surface of the bracket. The circuit part may be detachably mounted to the back surface of the bracket.

The frame may include a coupling protrusion configured to couple the frame to the support such that the frame is disposed in the forward direction relative to the support, and the coupling protrusion may protrude from the frame in a backward direction that is opposite the forward direction. The coupling protrusion may include a flange, a moving part, and an elastic part configured to exert a force on the moving part in a direction towards the flange.

The elastic part may be configured to exert the force on the moving part in the forward direction. The moving part may include a first outer diameter and a second outer diameter with a width of the first outer diameter being greater than a width of the second outer diameter, and the first outer diameter is disposed in the forward direction relative to the second outer diameter.

The support may include a coupling hole configured to couple with the coupling protrusion and the coupling hole may extend in an oblique direction, relative to a vertical direction that is orthogonal to the forward direction, such that the coupling protrusion is inserted into the coupling hole in an oblique direction, relative to the vertical direction.

BRIEF DESCRIPTION OF THE DRAWINGS

The above and/or other aspects will become more apparent by describing in detail embodiments with reference to the accompanying drawings, in which.

DETAILED DESCRIPTION OF EXEMPLARY EMBODIMENTS

Figure 1:
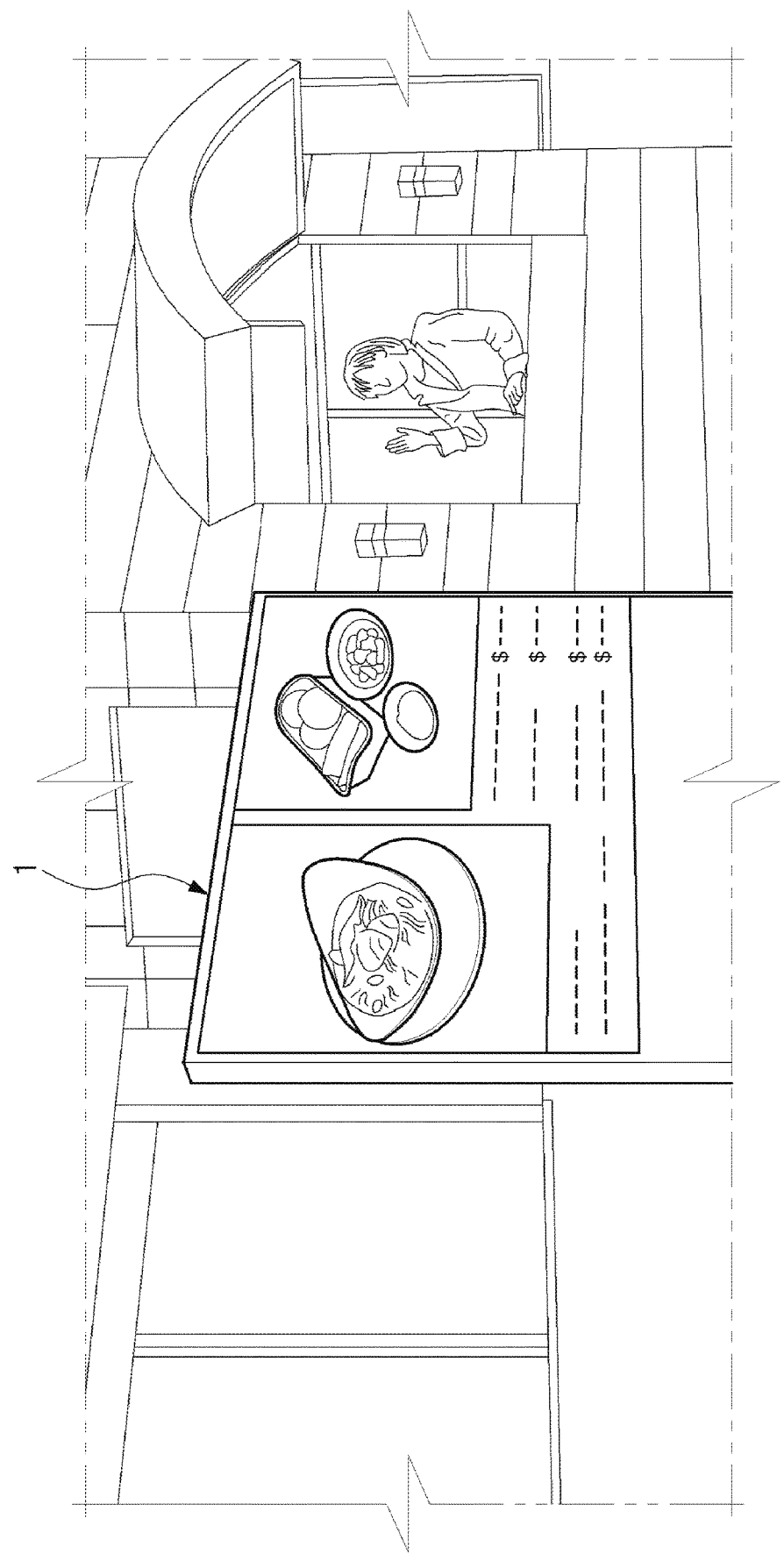
FIG. 1 schematically shows a display apparatus installed outdoors, according to an embodiment.

Exemplary embodiments described herein and shown in the accompanying drawings are merely examples of the embodiments of the present disclosure, and various modifications may be made to replace the embodiments of the present disclosure at the time of filing.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises," "comprising," "includes," and "including" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc., may be used herein to describe various components, these components should not be limited by these terms. These terms are only used to distinguish one component from another. For example, a first component may also be called a second component, while the second component may be called a first component.

Descriptions shall be understood as to include any and all combinations of one or more of the associated listed items when the items are described by using the conjunctive term "~ and/or ~," or the like.

Content may be displayed on a display apparatus. The content may be received from a control device connected to the display apparatus and/or another display apparatus connected to the display apparatus. The content may also be received from an external server. The content may include a video files or audio file played by an application, e.g., a video player, a music file played by a music player, a photo file presented in a photo gallery, a web page file presented by a web browser, a text file, or the like. The content may also include broadcasting content.

Embodiments will now be described more fully with reference to the accompanying drawings.

Figure 2:
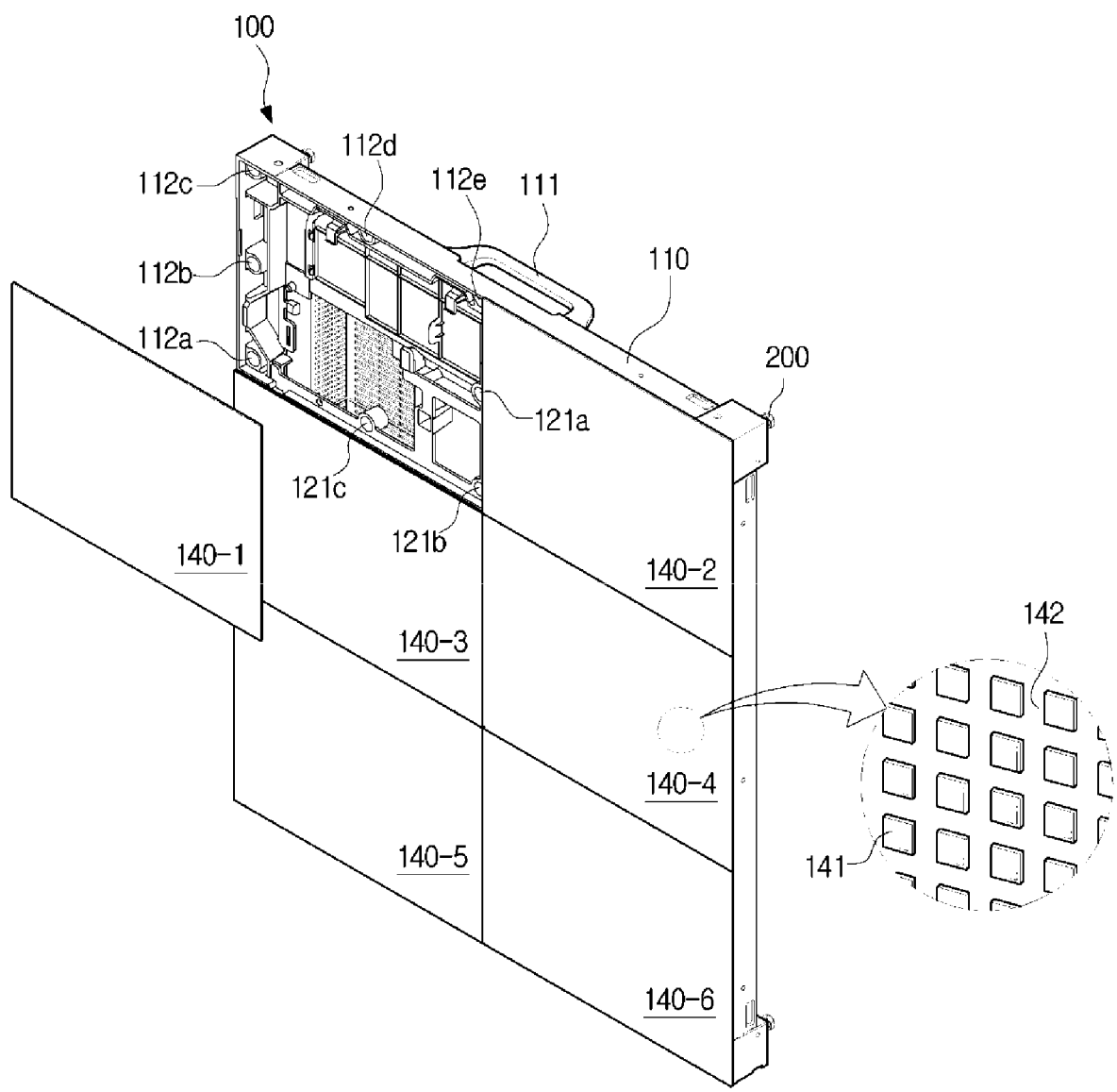
FIG. 2 is a front perspective view of a display module, according to an embodiment, in which one of a plurality of LED panels is separated from a frame.
Figure 3:
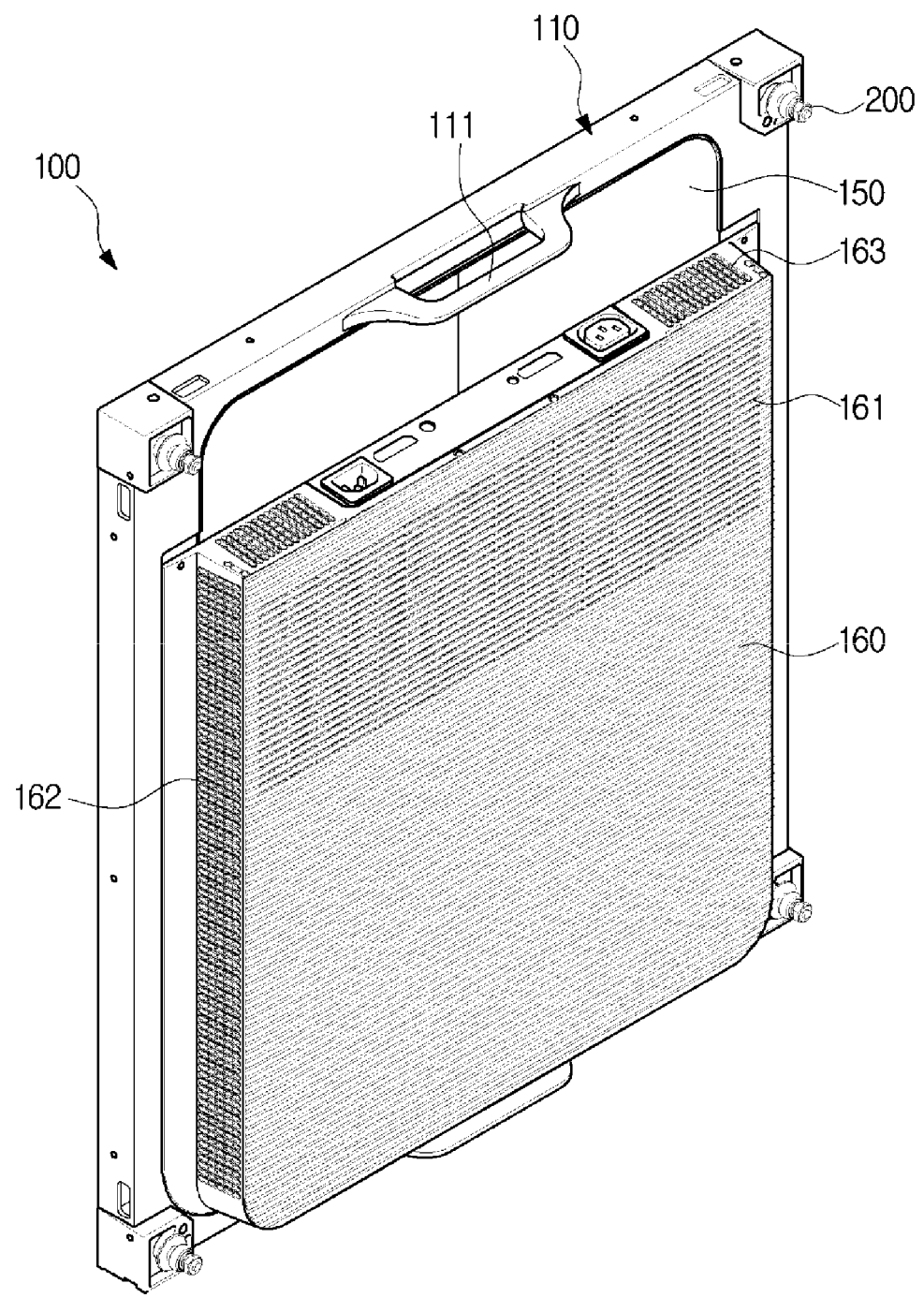
FIG. 3 is a rear perspective view of a display module, according to an embodiment.

FIG. 1 schematically shows a display apparatus installed outdoors, according to an embodiment, FIG. 2 is a front perspective view of a display module, according to an embodiment, in which one of a plurality of LED panels is separated from a frame, and FIG. 3 is a rear perspective view of a display module, according to an embodiment.

Referring to FIG. 1, a display apparatus 1 is installed outdoors. However, the embodiment is not limited thereto. For example, the display apparatus 1 may be installed indoors.

In FIG. 1, the display apparatus 1 installed outdoors (or indoors) may be provided for the user as a billboard to display products and/or prices thereof.

The display apparatus 1 may include a display module 100 and a support 300. A plurality of display modules 100 may be provided, and each of the display modules 100 may be detachably coupled to the support 300.

Referring to FIGS. 2 and 3, the display module 100 may include a plurality of LED modules 140-1 to 140-6 as shown in the drawings. However, the present disclosure is not limited to this, and the display module may include one LED module. Each of the plurality of LED modules 140-1 to 140-6 includes a plurality of LEDs 141, and the plurality of LEDs 141 may be used to display the content.

For example, the LED module 140-4 may include the plurality of LEDs 141 and a circuit board 142 on which a plurality of LEDs 141 are mounted in the form of a matrix. In an embodiment, the LED module 140-4 is representative of other LED modules 140-1 to 140-3 and 140-4 to 140-6. In another embodiment some of the other LED modules 140-1 to 140-3 and 140-4 to 140-6 may have a different configuration.

The LED module 140-4 may be implemented by arranging LEDs emitting red, green, and blue light in the form of a matrix.

The LED module 140-4 may include red, green and blue LEDs by packaging the red, green and blue LEDs in a pixel and arranging a plurality of pixels in the form of a matrix. The red, green, and blue LEDs constituting one pixel may be called a sub pixel. The pixel may be implemented with LEDs emitting light in white color and color filters for filtering the white light of the LEDs into various colors.

As for the LEDs 141, a pixel is implemented with sub pixels: red, green, and blue LEDs, and such a pixel may be repeatedly/cyclically arranged.

The LEDs 141 in the LED module, for example LED module 140-4, may cause the LED modules to emit light in a forward direction. This forward direction can be generally orthogonal to the plane of a surface of the LED modules but is not limited to that general direction and can be any direction that is oblique to a surface of the LED modules.

The plurality of LEDs 141 may be mounted on the circuit board 142 in the form of a matrix (e.g., M×N, where M and N are integers). The matrix may be a square matrix (e.g., 16×16 matrix, 24×24 matrix, etc., i.e., M=N, where M and N are integers), or a rectangular matrix (i.e., M≠N).

The plurality of LED modules 140-1 to 140-6 are arranged in the form of a matrix may be mounted to a frame 110. The single LED module (in another exemplary embodiment) or a plurality of LED modules (six modules) 140-1 to 140-6 arranged in the form of a matrix (M×N, where M and N are integers) may be mounted to the frame 110.

Referring to FIG. 2, a display module 100 including the plurality of LED modules 140-1 to 140-6 in a 2×3 arrangement is shown. However, it will be easily understood by those skilled in the art that the number of LED modules in a matrix form and the arrangement pattern can be variously modified.

The back of the LED module, for example LED module 140-1, may be attached to or detached from the frame 110 and bracket 120 (see FIGS. 13, 14) by a magnetic force. Furthermore, a third coupling member 143 (see FIG. 11), described below, located on a back face of the LED module, for example LED module 140-1, may be mounted to or detached from the frame 110 and bracket 120 by being magnetized by an external magnetic force. It will be described below.

The plurality of LED modules 140-1 to 140-6 may implement a screen using the plurality of LEDs 141. The plurality of LED modules 140-1 to 140-6 may display the content by driving the plurality of LEDs 141.

Referring to FIG. 3, the display module 100 may include a handle 111, a cover plate 150, a cover frame 160, and a coupling protrusion 200.

The frame 110 may include openings. The cover frame 160 and the cover plate 150 may cover the opening of the frame 110 at the rear.

Figure 11:
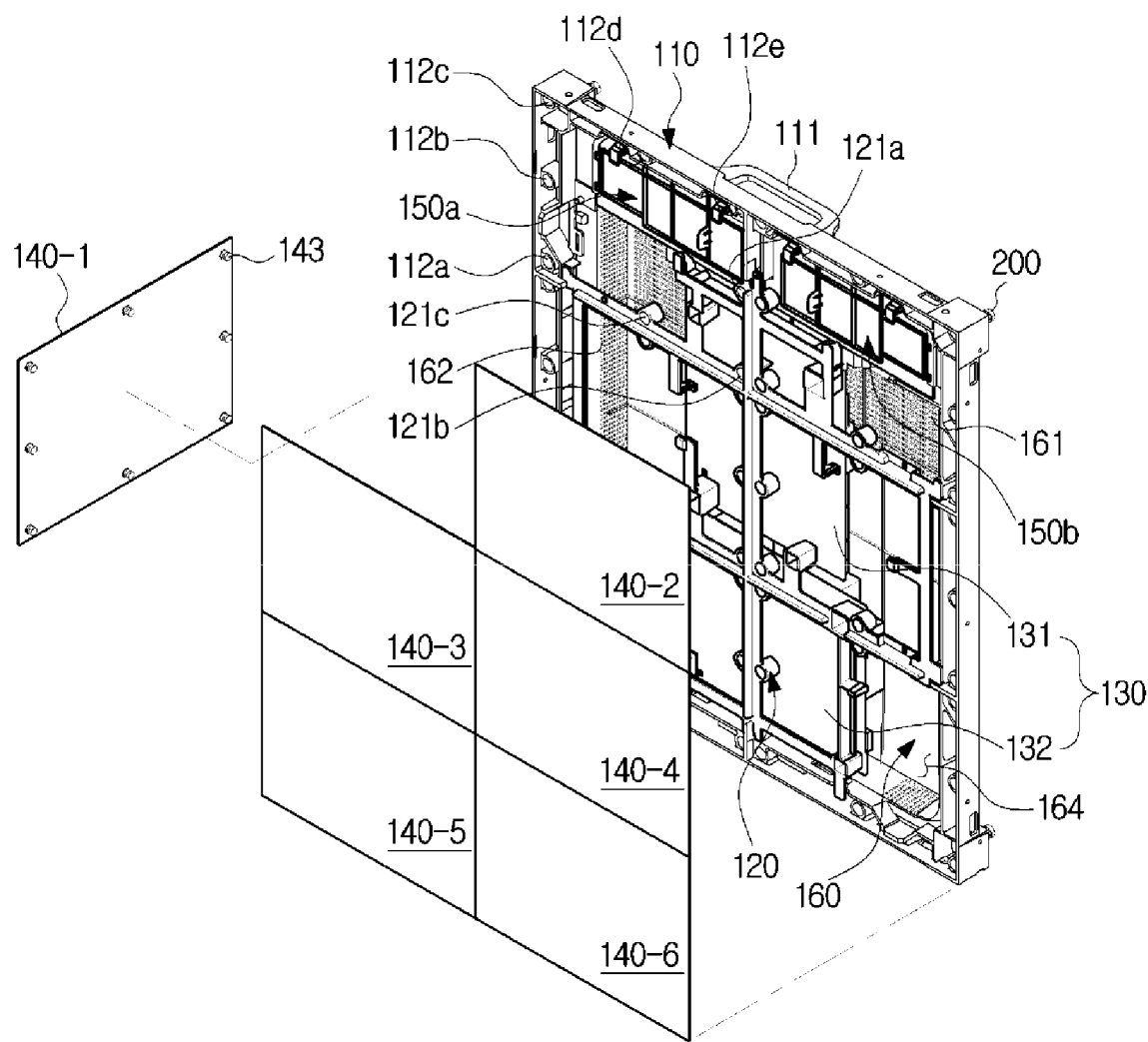
FIG. 11 is an exploded view of a display module, according to an embodiment, in which an LED module is separated from a frame.

The cover frame 160 may form a receiving space 164 for receiving the circuit part 130 (see FIG. 11). The cover frame 160 may include slits 161, 162, and 163 to effectively 13 dissipate heat generated from the circuit part 130 and the LED modules 140-1 to 140-6. Particularly, the first slit portion 161 may be formed on the rear surface of the cover frame 160, the second slit portion 162 may be formed on both side surfaces of the cover frame 160, and the third slit portion 163 may be formed on the upper surface of the cover frame 160.

The cover plate 150 may be provided to cover the rear surface of the frame 110 that is not covered by the cover frame 160. The cover plate 150 may be detachably mounted to the frame 110. It will be described below.

The cover plate 150 may include a slit in the same manner as the cover frame 160. More particularly, the cover plate 150 may include a plurality of slits, or alternatively, may include a plurality of holes. In this case, the slit may mean a substantially rectangular hole, and the hole may mean a substantially circular hole. The plurality of slits and the plurality of holes may be provided to effectively dissipate heat generated from the LED modules 140-1 to 140-6 and the circuit part 130.

Figure 4:
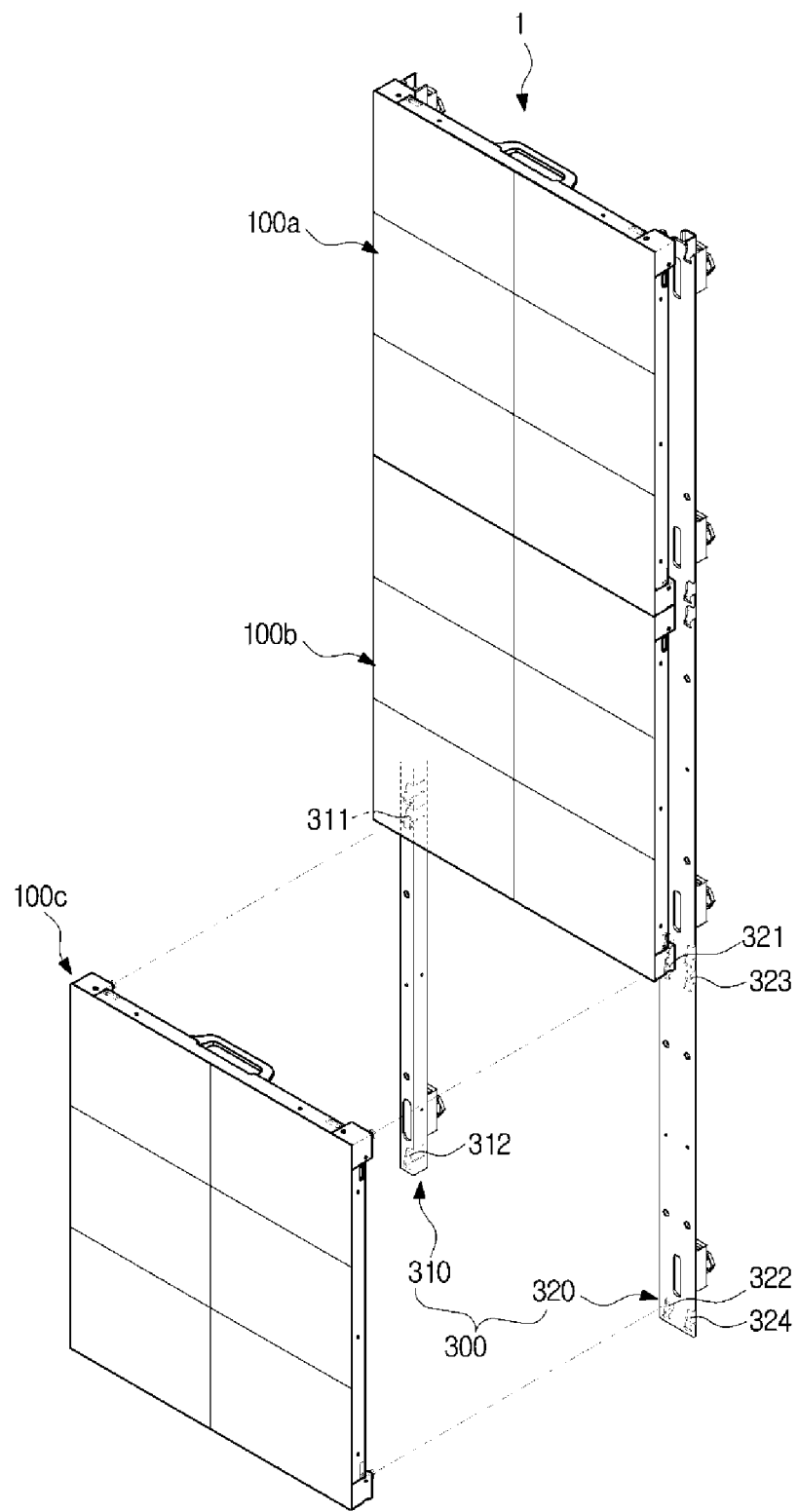
FIG. 4 shows a view of a display apparatus, according to an embodiment, in which one of a plurality of display modules is separated from a support.

FIG. 4 shows a view of a display apparatus, according to an embodiment, in which one of a plurality of display modules is separated from a support.

The display apparatus 1 may include one display module 100 or a plurality of display modules 100a, 100b, and 100c. The plurality of display modules may be arranged in an M×N matrix form. For example, the plurality of display modules may be arranged in the form of a 1×3 matrix, as shown in FIG. 4. In addition, each of the display modules may include one LED module or a plurality of LED modules arranged in a matrix form.

The display apparatus 1 may include a display module 100 and a support 300 that is provided to support the display module 100.

The display module 100 may include a plurality of coupling protrusions 200 on its rear surface.

The support 300 may include a coupling hole for inserting and sliding the coupling protrusion 200.

The support 300 may include a first support 310 and a second support 320. The first support 310 may be provided at the left and right ends of the display apparatus 1. The second support 320 may be provided at a portion of the display apparatus 1 other than the left and right ends thereof. The first support 310 may include one coupling hole in a horizontal direction, and the second support 320 may include two coupling holes in the horizontal direction. The number of coupling holes is only an example, and may be changed according to the design specification. The number of coupling holes in the horizontal direction of the second support may be greater than the number of coupling holes in the horizontal direction of the first support.

The display module 100 may include a coupling protrusion 200 at each corner. For example, the display module 100 may include four coupling protrusions. At this time, the first support 310 may include two coupling holes 311 and 312, and the second support 320 may include four coupling holes 321 to 324. Some 323 and 324 of the coupling holes of the second support 320 are for mounting another display module on the right side of the display module 100c.

Figure 5:
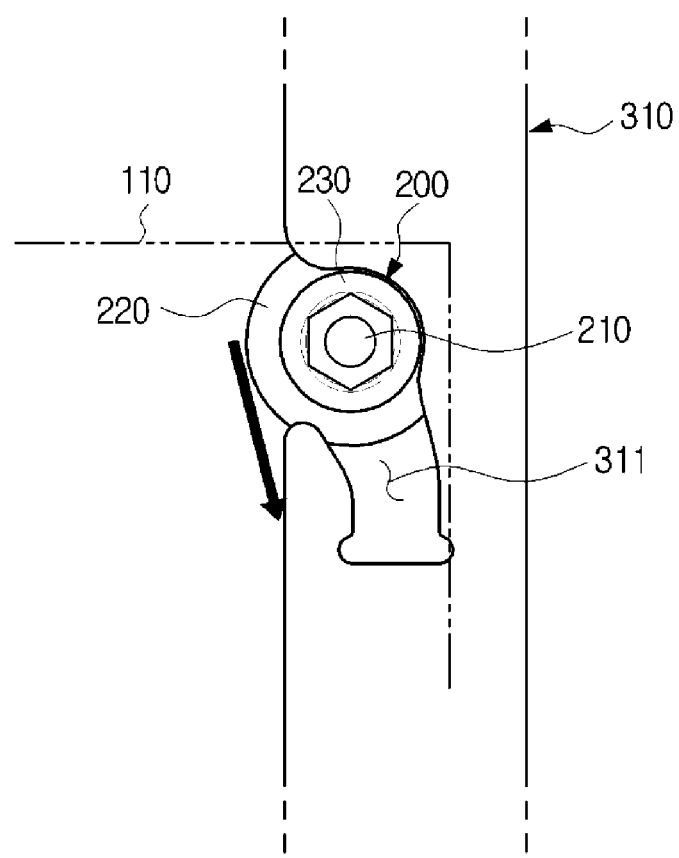
FIGS. 5 and 6 show a coupling operation between coupling protrusion and a coupling hole in a display apparatus, according to an embodiment.
Figure 6:
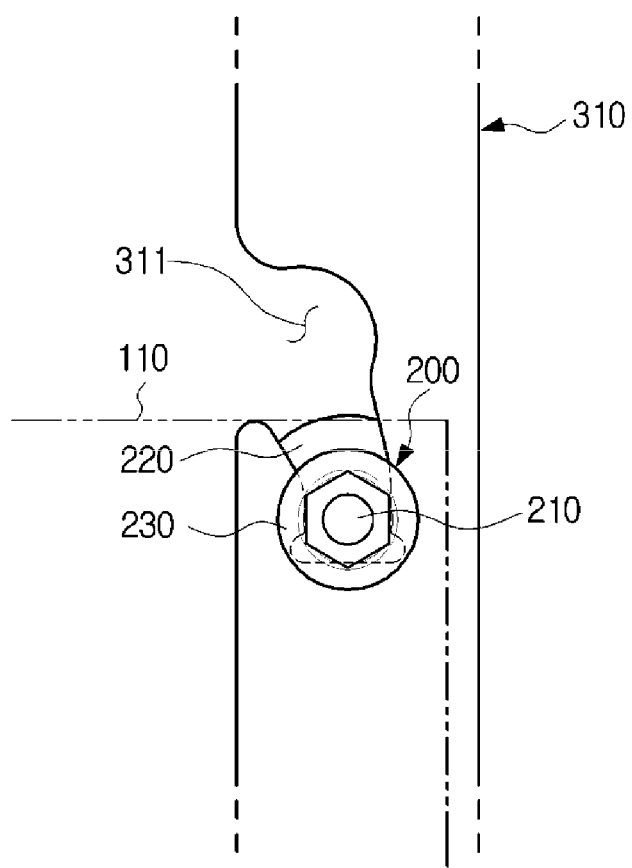

FIGS. 5 and 6 show a coupling operation between a coupling protrusion and a coupling hole in a display apparatus, according to an embodiment.

Referring to FIGS. 5 and 6, a coupling protrusion 200 may be inserted into a coupling hole 311.

The coupling hole 311 may be opened at one side. However, the present disclosure is not limited thereto. The coupling hole may be formed to have no open portion. That is, the coupling hole may be provided to form a closed loop.

As shown in FIG. 6, the coupling hole 311 may extend in an oblique direction. Accordingly, when the plurality of display modules 100 are installed on the support 300, damages to the display module 100 may be prevented.

When the plurality of display modules are mounted on the support 300 in a state in which the coupling holes 311 extend in the vertical direction, the adjacent display modules move up and down with their side surfaces in contact with each other. The LED module may be damaged in the process of moving the display modules in contact with each other.

When the coupling hole 311 extends in an oblique direction, each side of the adjacent display modules comes into contact once when the mounting is completed. There is no process of moving the display module in a contact with the other display module, so that the risk that the LED module or the like is damaged by the impact is reduced. This reduces the risk of breakage of the display module during the installation of the display module to the support.

In addition, since the display module 100 may be mounted on the support 300 by inserting the coupling protrusion 200 into the coupling hole 311 and then sliding the coupling protrusion 200 in the coupling hole 311 without an additional coupling member, the display module 100 may be easily mounted. Similarly, since the display module 100 may be separated from the support 300 after sliding the display module 100 without an additional coupling member, the display module 100 may be easily separated.

The display module 100 may be mounted on the support 300 or separated from the support 300 without separating the LED modules 140-1 to 140-6 from the frame 110. Since the process of separating the LED modules 140-1 to 140-6 from the frame 110 is omitted in order to mount the display module 100 on the support 300 or separate from the support 300, the installing process and separating process is simplified. In addition, although the LED module, for example LED module 140-1, may be damaged in the process of repeatedly separating and installing the LED module 140-1, the risk of such damage may be very small according to the present disclosure.

Since there is no process performed behind the support 300 when the display module 100 is installed on the support 300, it is not necessary to provide a work space behind the support 300. In other words, when the display module 100 is mounted on the support 300, the operation is performed only in front of the support 300, and thus if there is no work space behind the support 300, it may not cause any inconvenience. As a result, space usability may be improved.

Figure 7:
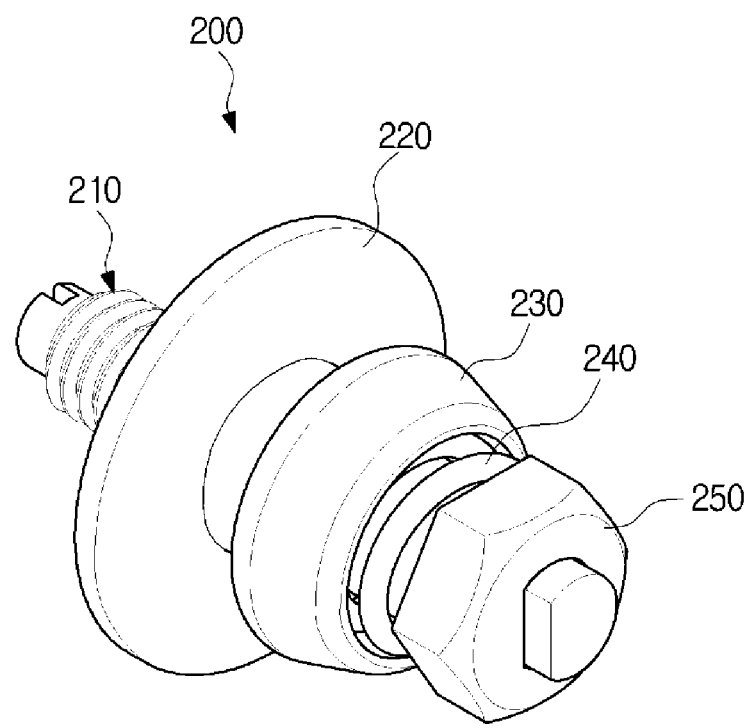
FIG. 7 is a view of a coupling protrusion in a display module, according to an embodiment.
Figure 8:
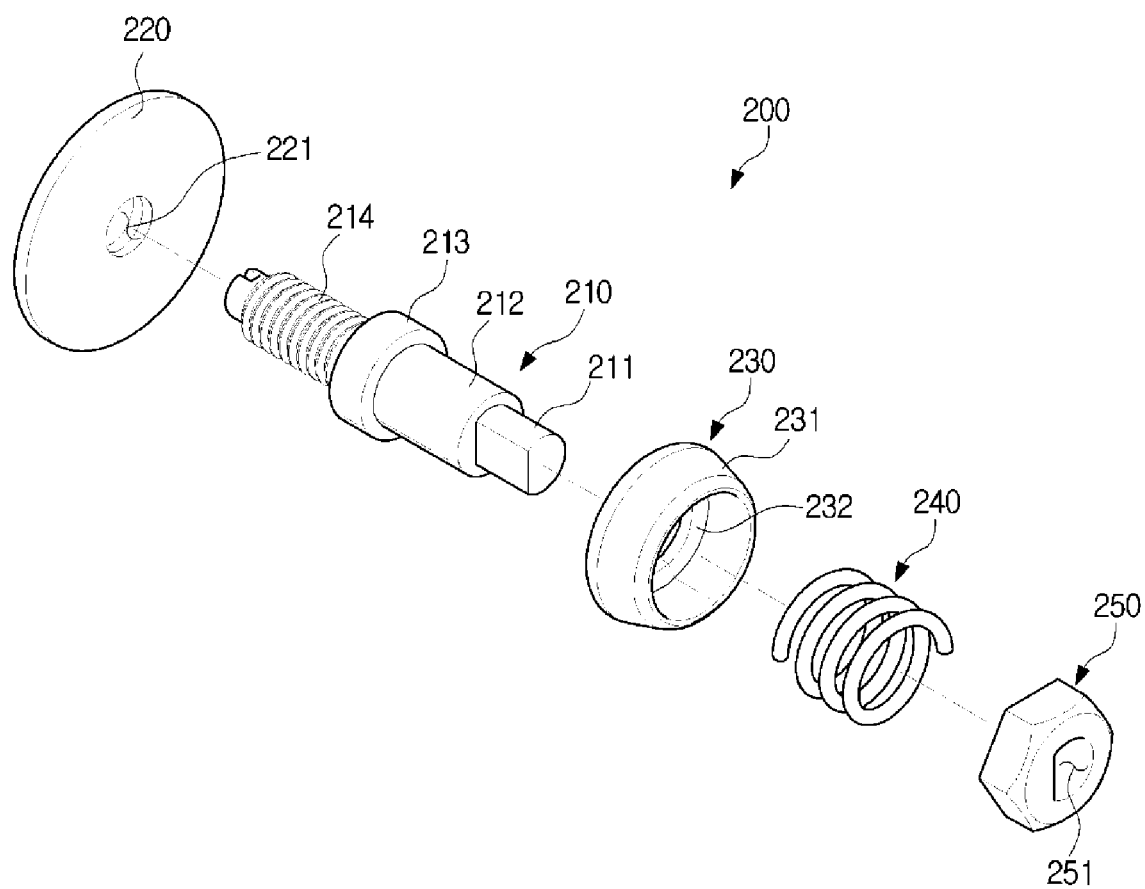
FIG. 8 is an exploded perspective view of the coupling protrusion shown in FIG. 7.

FIG. 7 is a view of a coupling protrusion in a display module, according to an embodiment. FIG. 8 is an exploded perspective view of the coupling protrusion shown in FIG. 7.

Referring to FIGS. 7 and 8, the coupling protrusion 200 includes a flange 220, a body 210, a moving part 230, an elastic member 240, and a head 250.

The head 250 may include a hollow 251 that is formed in a partially circular or cylindrical shape, with a portion of the shape of the hallow being a flat surface.

The body 210 may include a rivet 211 corresponding to the shape of the hollow 251 to be inserted into the hollow 251 of the head 250, a shaft 212 extending from the rivet 211, a stopper 213 provided at an end of the shaft 212, and a threaded portion 214 including a screw thread.

By providing the threaded portion 214, the coupling protrusion 200 may be screwed into the frame 110.

The flange 220 may include a hollow 221 into which the threaded portion 214 is inserted. When the threaded portion 214 is inserted into the hollow 221, the flange 220 may be in contact with one end of the stopper 213. That is, the diameter of the stopper 213 may be greater than the diameter of the hollow 221.

The moving part 230 may include a hollow 232, and the diameter of the hollow 232 may be greater than the diameter of the shaft 212. Thus, the shaft 212 may be inserted into the hollow 232 of the moving part 230.

The diameter of the hollow 232 of the moving part 230 may be smaller than the diameter of the stopper 213. Thus, the stopper 213 may not pass through the hollow 232 of the moving part 230. The moving part 230 may be in contact with the opposite end of the stopper 213.

The moving part 230 may include an inclined guide 231 to guide the coupling protrusion 200 to be inserted into the coupling hole 311. By the guide 231, the moving part 230 is provided with a smaller outer diameter at one end than at the opposite end. The one end of the moving part 230 having a smaller outer diameter may easily pass through the coupling hole 311. The opposite end of the moving part 230 having a larger outer diameter may not easily pass through the coupling hole 311. The coupling protrusion 200 may be easily inserted into the coupling hole 311 due to the one end of the moving part 230 having a smaller outer diameter and the coupling protrusion 200 may be easily caught on the coupling hole 311 due to the other end of the moving part 230 having a larger outer diameter.

The elastic member 240 may be disposed between the moving part 230 and the head 250. The elastic member 240 may be provided as a compression spring.

After the rivet 211 is inserted into the hollow 251 of the head 250, the rivet 211 may be deformed by pressing. That is, the shape of the end of the rivet 211 may be deformed so that the body 210 and the head 250 may be permanently combined.

One end of the elastic member 240 may be in contact with the head 250 and the opposite end thereof may be in contact with the moving part 230. As described above, the head 250 is not detached from the body 210 when the shape of the rivet 211 is changed. The moving part 230 may move along the shaft 212 within a predetermined range. The elastic member 230 may provide an elastic force in a direction in which the moving part 230 is in contact with the stopper 213.

Figure 9:
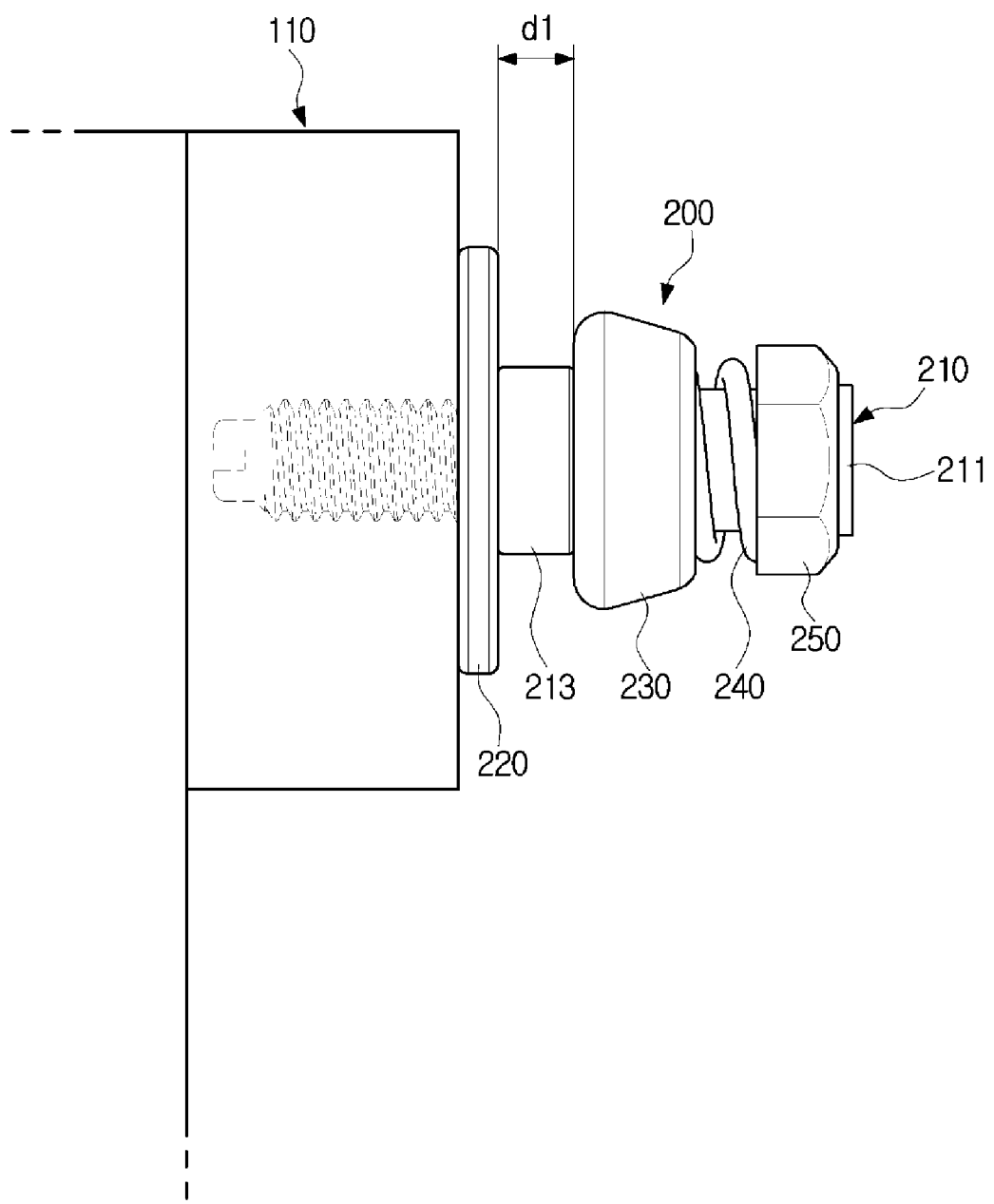
FIG. 9 is side view of a display module in a display apparatus, according to an embodiment, before a coupling protrusion is coupled to a support.
Figure 10:
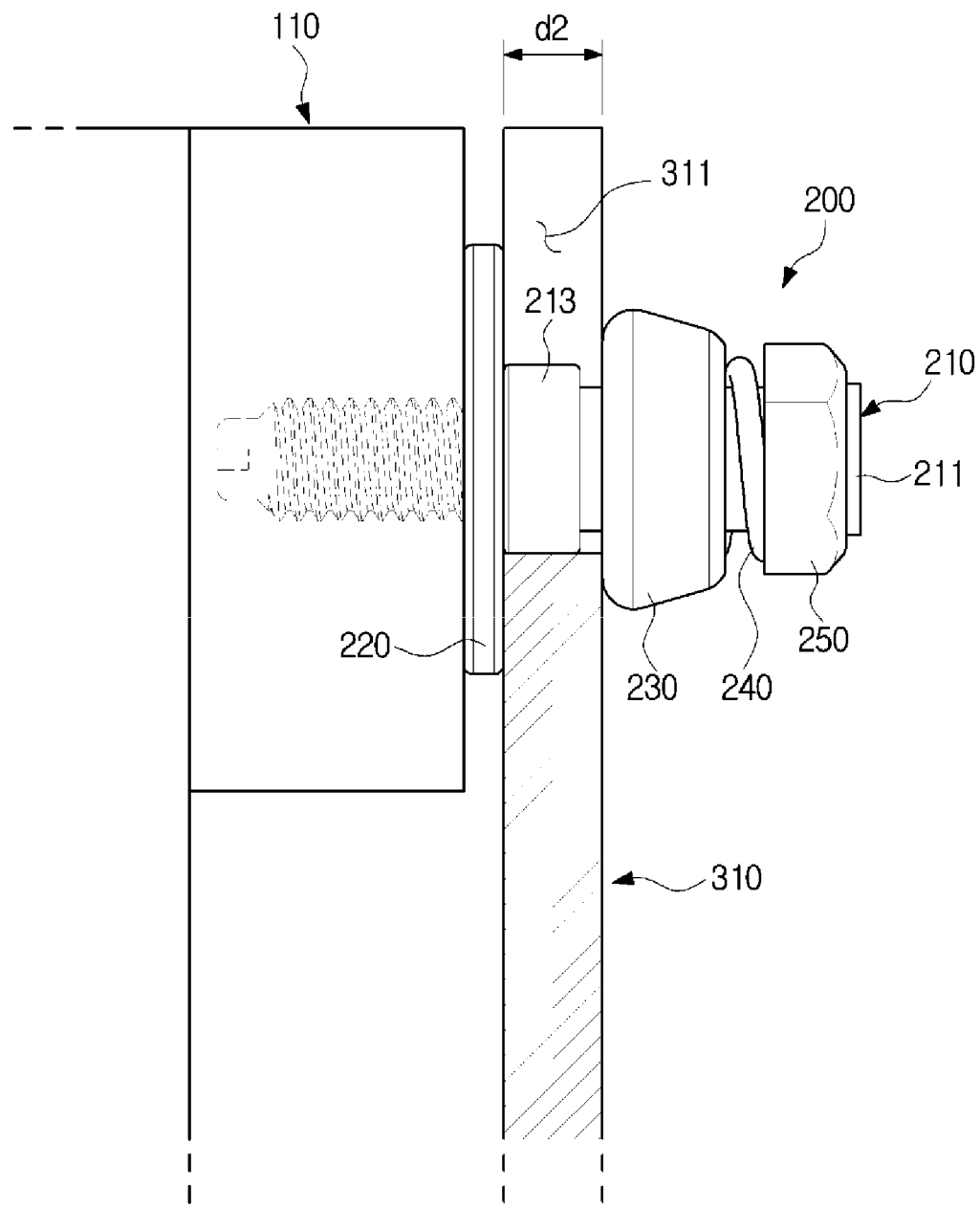
FIG. 10 is a side view of a display module and a support in a display apparatus, according to an embodiment, after a coupling protrusion is coupled to the support.

FIG. 9 is side view of a display module in a display apparatus, according to an embodiment, before a coupling protrusion is coupled to a support. FIG. 10 is a side view of a display module and a support in a display apparatus, according to an embodiment, after a coupling protrusion is coupled to the support.

Meanwhile, FIG. 7 shows a state before the shape of the rivet 211 is deformed by pressing or the like. FIGS. 9 and 10 show the state after the shape of the rivet 211 is deformed.

Referring to FIG. 9, before the coupling protrusion 200 is coupled to the coupling hole 311, the moving part 230 may be kept in contact with the stopper 213. Since the elastic member 240 provides an elastic force so that the moving part 230 is in contact with the stopper 213. At this time, the shortest distance between the flange 220 and the moving part 230 is d1.

Referring to FIG. 10, the shortest distance between the flange 220 and the moving part 230 is d2. d2 may be the thickness of the first support 310. That is, the thickness of the first support 310 may be greater than d1.

When the coupling protrusion 200 is inserted into the coupling hole 311, one surface of the first support 310 may be in contact with the flange 220 and the opposite surface of the first support 310 may be in contact with the moving part 230. At this time, the elastic member 240 is compressed by d2−d1, and may provide a greater elastic force to the moving part 230.

Accordingly, when the display module 100 is mounted on the support 300, the display module 100 may be stably fixed. That is, the clearance between the display module 100 and the support 300 is very small due to the elastic force of the elastic member 240. As the clearance is small, the movement of the display module 100 is restricted. Further, the plurality of display modules may be uniformly arranged in the back and forth direction or the coupling direction. In other words, the plurality of display modules may not protrude or be recessed in the back and forth direction.

FIG. 11 is an exploded view of a display module, according to an embodiment, in which an LED module 140-1 is separated from a frame.

Figure 12:
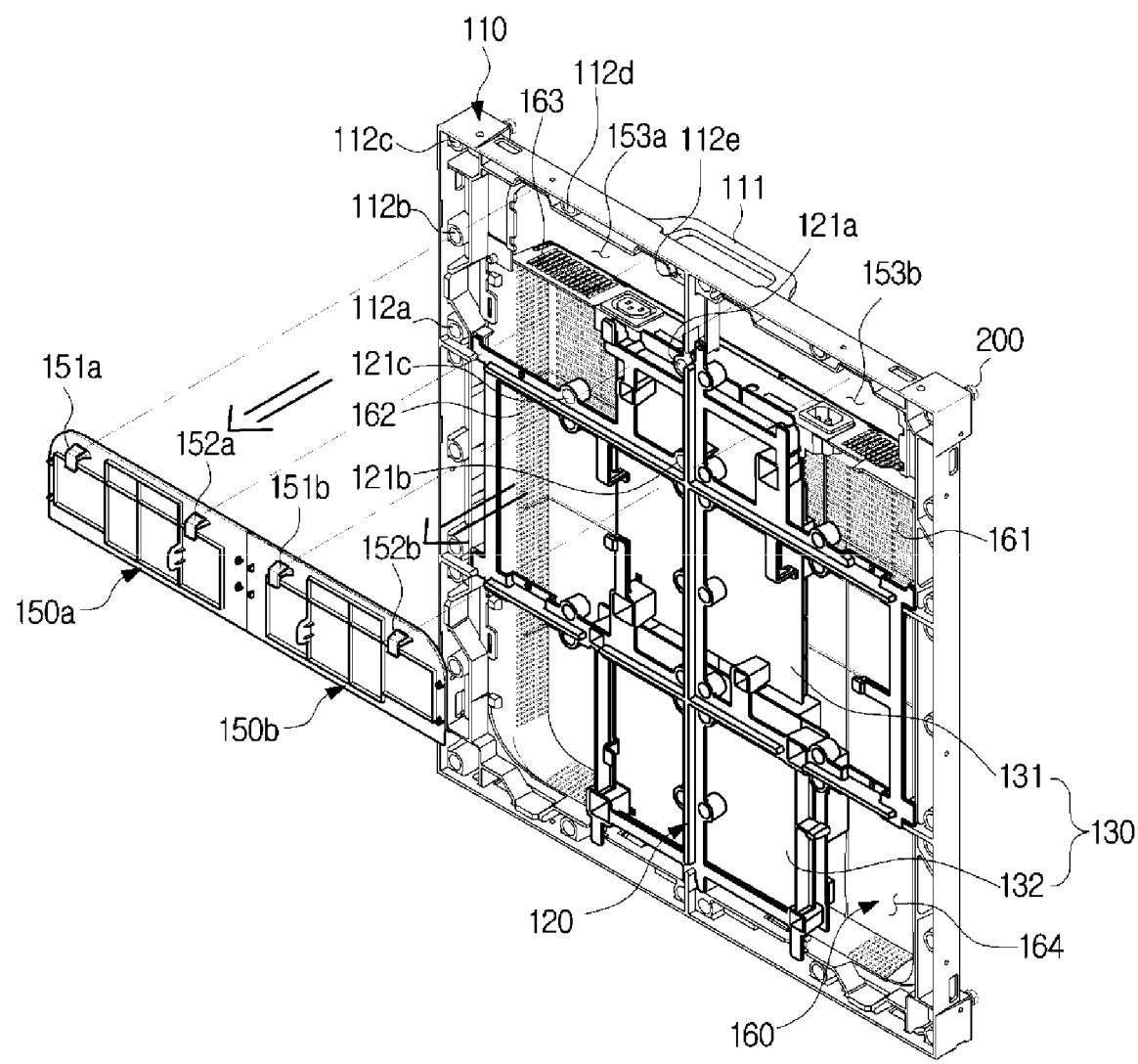
FIG. 12 shows an operation in which a cover plate is separated from a frame in a display module, according to an embodiment.

FIG. 12 shows an operation in which a cover plate 150 is separated from a frame in a display module 100, according to an embodiment.

Figure 13:
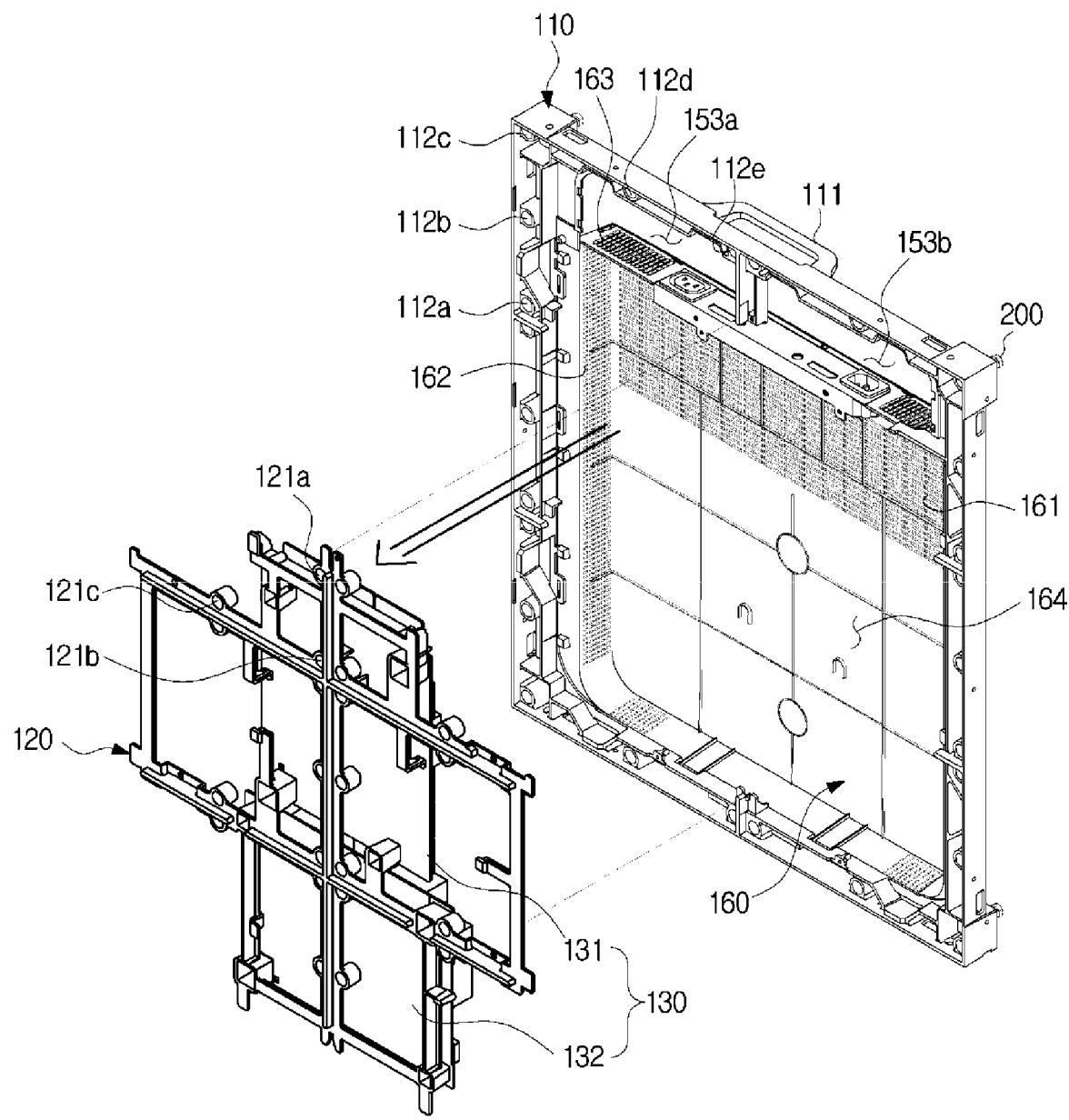
FIG. 13 shows an operation in which a bracket is separated from a frame in ad display module, according to an embodiment.

FIG. 13 shows an operation in which a bracket 120 is separated from a frame in a display module 100, according to an embodiment.

Figure 14:
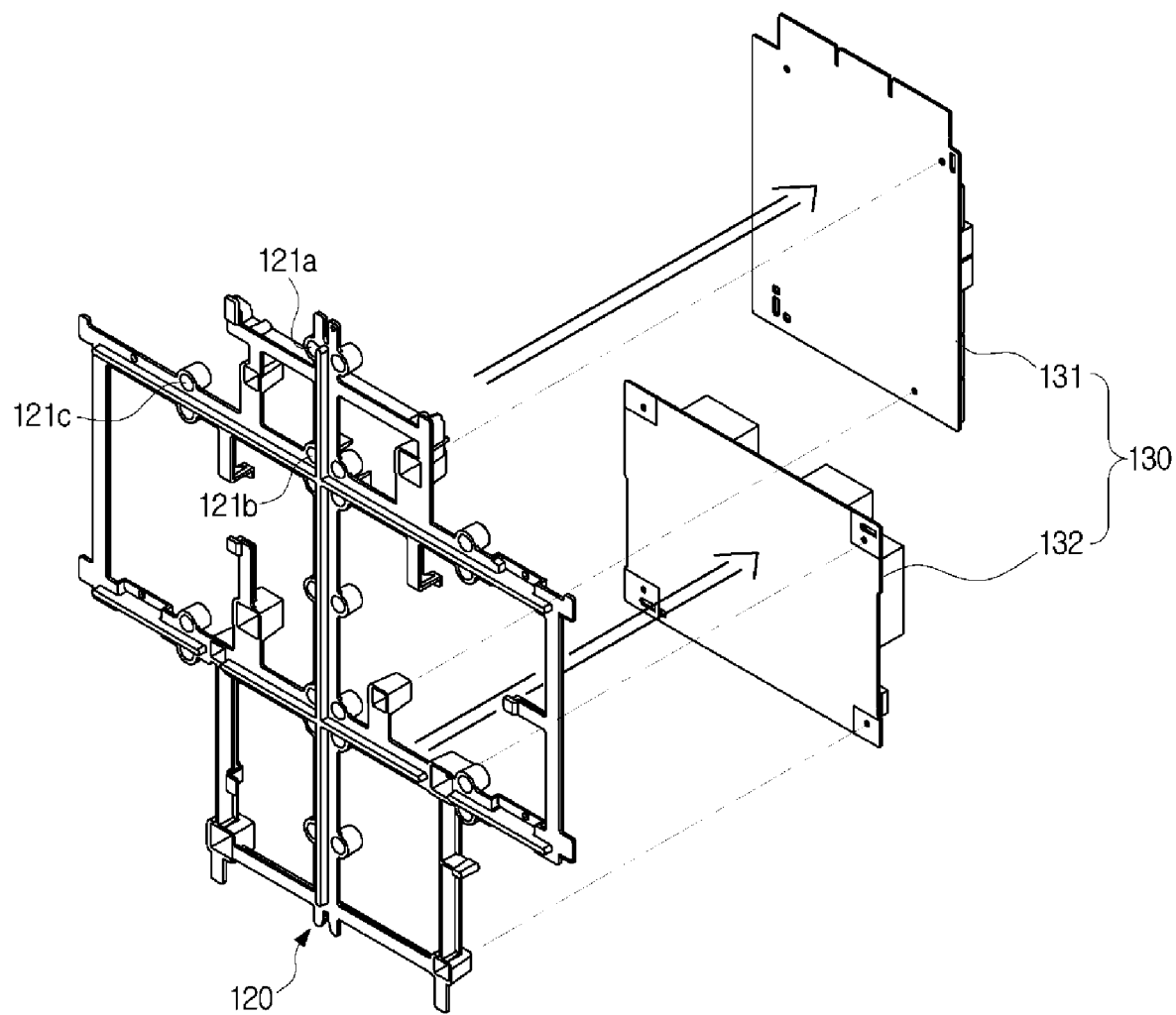
FIG. 14 shows an operation in which a circuit part is separated from a bracket in a display module, according to an embodiment.

FIG. 14 shows an operation in which a circuit part 130 is separated from a bracket in a display module 100, according to an embodiment.

Referring to FIGS. 11 to 14, a process of separating a circuit part 130 from a display module 100 according to an embodiment will be described in detail.

The display module 100 may include a circuit part 130 that supplies a driving signal to the LED module, for example LED module 140-1, and supplies power. The circuit part 130 may include a control board 131 for providing a driving signal to the LED module 140-1 and a power supply 132 for supplying power to the LED module 140-1. The circuit part 130 may be detachably mounted to the bracket 120.

The control board 131 and the power supply 132 may be integrally provided.

In the process of using the display apparatus 1 including a plurality of display modules 100, some of the display modules 100 or some of the LED modules, for example LED module 140-1, may not operate normally. The LED module 140-1 may not operate normally due to various causes. Typically, when a problem occurs in the LED module 140-1 or a problem occurs in the circuit part 130, the LED module 140-1 may not operate normally.

According to the present embodiment, the LED module 140-1 may be separated from the display module 100 without separating the display module 100 from the support 300.

As shown in FIG. 11, a plurality of third coupling members 143 may be provided on the rear surface of the LED module 140-1. The third coupling member 143 may be coupled to a first coupling member, for example first coupling member 112a, and a second coupling member, for example second coupling member 121a, described below, by magnetic force. The third coupling member 143 may be provided so as to be magnetized to the N-pole or the S-pole. The third coupling member 143 may include a magnetizable material. The third coupling member may include a third magnetic material. The third coupling members 143 may be spaced apart from each other along the periphery of the LED module 140-1. According to this embodiment, eight third coupling members 143 may be provided, but the number and arrangement thereof may be changed according to design specifications. Here a magnetic or magnetizable materials are any materials that produces a magnetic field in response to an applied magnetic field or any material that produces its own magnetic field, such as a magnet.

The frame 110 may include the first coupling members 112a to 112e that are provided to be coupled to the third coupling members 143 by a magnetic force.

The first coupling members 112a to 112e may include a magnet. In an alternative embodiment, the first coupling members may include any first magnetic material. The first coupling members 112a to 112e may be spaced apart from each other along the periphery of the frame 110.

The bracket 120 may include plurality of the second coupling members 121a to 121c that are provided to be coupled to the third coupling member 143 by a magnetic force.

The second coupling members 121a to 121c may include a magnet. In an alternative embodiment, the second coupling members 121a to 121c may include any second magnetic material.

As described above, a plurality of LED modules 140-1 to 140-6 may be provided. Hereinafter, a process of coupling the LED module 140-1 among the plurality of LED modules 140-1 to 140-6 to the frame 110 and the bracket 120 will be described.

A plurality of first coupling members 112a to 112e may be provided in the frame 110 and a plurality of second coupling members 121a to 121c may be provided in the bracket 120.

A plurality of third coupling members 143 may be provided on the rear surface of the LED module 140-1 so as to correspond to the number of the first coupling members 112a to 112e and the second coupling members 121a to 121c.

Some of the third coupling members 143 may be coupled to the first coupling members 112a to 112e by the magnetic force.

The other third coupling members 143 may be coupled to the plurality of second coupling members 121a to 121c by the magnetic force.

When separating the LED module 140-1 from the frame 110 and the bracket 120, the LED module 140-1 may be separated from the frame 110 and the bracket 120 in front of the display module 100 by using an auxiliary tool. Therefore, when the LED module 140-1 is replaced or repaired, work is not performed in the rear of the display apparatus 1, so space usability may be improved. In addition, since it is necessary to separate the LED module 140-1 after confirming the LED module 140-1, which does not operate normally, in front of the display apparatus 1, it is easier to separate the LED module 140-1 in front of the display apparatus 1.

Referring to FIG. 12, after the plurality of LED modules 140-1 to 140-6 are separated from the frame 110, the cover plate 150 may be removed from the frame 110.

A plurality of cover plates may be provided. For example, the cover plate 150 may include a first cover plate 150a and a second cover plate 150b.

Each cover plate 150 may include a plurality of engaging portions 151a, 151b, and 152a, 152b for releasable engagement with the frame 110. The number of the cover plates and the engaging portions may be variously provided.

The cover plate 150 may be provided to cover the opening of the frame 110 that is not covered by the cover frame 160.

The cover plate 150 may be provided to cover the first opening 153a and the second opening 153b, as shown in the drawings. More particularly, the first cover plate 150a may cover the first opening 153a, and the second cover plate 150b may cover the second opening 153b.

The cover plate 150 may include a plurality of holes or a plurality of slits. Accordingly, the heat generated from the LED module, for example LED module 140-1, and the circuit part 130 may be efficiently discharged to the outside.

After the cover plate 150 is removed from the frame 110, a cable for connecting the external power source and the power supply 132 and/or a wire for connecting the external control device and the control board may be separated from the circuit part 130 through the first opening 153a and the second opening 153b.

As shown in FIG. 13, the bracket 120 may be separated from the frame 110. At the front of the frame 110, the bracket 120 may be separated from the frame 110.

As shown in FIG. 14, the circuit part 130 may be separated from the separated bracket 120. Particularly, the control board 131 and/or the power supply 132 may be separated from the bracket 120.

According to the display apparatus of the present disclosure, the LED module may be approachable in front of the display without approaching the rear of the display apparatus through the above-described process. In addition, a circuit part disposed within the display module may be approachable in front of the display apparatus. Approach may be used to mean mounting and separating.

According to the disclosure, there may be provided a display apparatus including a display module configured to be installed to a support or separated from a support in front of the support.

According to the disclosure, there may be provided a display module having a circuit part configured to be approachable in front of the display module and a display apparatus having the same.

According to the disclosure, there may be provided a display apparatus capable of mitigating an impact due to contact between display modules when a plurality of display modules are installed to a support.

According to the disclosure, there may be provided a display apparatus capable of installing a display module to a support while an LED module is mounted on the display module.

According to the disclosure, there may be provided a display apparatus in which an additional coupling member is not required when a display module is installed to a support, thereby facilitating installation.

According to the disclosure, there may be provided a display apparatus with improved space usability.

Although a few embodiments of the disclosure have been shown and described, it will be appreciated by those skilled in the art that changes may be made in these embodiments without departing from the principles and spirit of the disclosure, the scope of which is defined in the claims and their equivalents.

What is claimed is:

1. A display module comprising:
a frame comprising a first coupling member;
a bracket comprising a second coupling member, the bracket being configured to be detachably mounted to the frame;
a circuit part configured to be detachably mounted to the bracket;
a light emitting diode (LED) module comprising a plurality of third coupling members configured to be detachably coupled to the first coupling member and the second coupling member by a magnetic force; and
a cover plate configured to be detachably mounted to the frame to cover a first area of a rear surface of the frame,
wherein the bracket and the circuit part are configured to be mounted to the frame in front of the frame or to be separated from the frame in front of the frame,
wherein at least one of the plurality of third coupling members is configured to be detachably coupled to the first coupling member,
wherein at least another of the plurality of third coupling members is configured to be detachably coupled to the second coupling member,
wherein when the LED module is coupled to the frame and the bracket, at least one of the plurality of third coupling members is coupled to the first coupling member by a magnetic force and at least another of the plurality of third coupling members is coupled to the second coupling member by a magnetic force, and
wherein the cover plate is configured to be mounted to the frame by moving the cover plate into the frame, from a front of the frame, and to be separated from the frame by moving the cover plate out of the frame, at the front of the frame.

2. The display module of claim 1, wherein the circuit part comprises:
a control board configured to provide a driving signal to drive the LED module; and
a power supply configured to supply power to the LED module.

3. The display module of claim 2, wherein the control board and the power supply are integrally disposed together.

4. The display module of claim 1, further comprising: a cover frame mounted to the rear surface of the frame to cover a second area which does not overlaps the first area, the cover frame forming a receiving space in which the circuit part is disposed.

5. The display module of claim 1, wherein the cover plate comprises a plurality of through holes or a plurality of slits passing through the cover plate.

6. The display module of claim 1, wherein the first coupling member comprises a first magnet, the second coupling member comprises a second magnet, and at least one of the plurality of the third coupling members comprises a magnetic material.

7. The display module of claim 1, wherein at least one of the plurality of third coupling members is configured to be magnetized to a N pole or a S pole,
wherein a distance between the at least one of the plurality of third coupling members and the first coupling member and a distance between the at least one of the plurality of third coupling members and the second coupling member is subject to change according to a polarity of the third coupling member.

8. A display apparatus comprising:
the display module of claim 1; and
a support comprising a coupling hole including a groove extending in an oblique direction, relative to a vertical direction that is orthogonal to a forward direction, and configured to support the frame.

9. The display apparatus of claim 8, wherein the display module further comprises a coupling protrusion configured to be inserted into the coupling hole, and
wherein the coupling protrusion comprises:
a flange disposed in contact with a first surface of the support; and
a moving part disposed in contact with a second surface of the support, the second surface of the support being opposite to the first surface of the support, and configured to be reciprocally movable within a predetermined range.

10. The display module of claim 9, wherein the coupling protrusion further comprises an elastic member,
wherein the moving part is disposed between the flange and the elastic member, and
wherein, when the coupling protrusion is inserted into the coupling hole, the elastic member provides an elastic force to the moving part such that the moving part moves toward the second surface of the support.

11. A display module comprising:
a frame comprising a first coupling member;
a bracket comprising a second coupling member, the bracket being configured to be detachably mounted to the frame;
a circuit part configured to be detachably mounted to a first surface of the bracket;
a light emitting diode (LED) module configured to be detachably mounted to a second surface of the bracket, the second surface being opposite to the first surface of the bracket, the LED module comprising a plurality of third coupling members,
wherein at least one of the plurality of the third coupling members is configured to be detachably coupled to the first coupling member by a magnetic force; and
a cover plate configured to be detachably mounted to the frame to cover a first area of a rear surface of the frame,
wherein at least another of the plurality of the third coupling members is configured to be detachably coupled to the second coupling member by a magnetic force,
wherein when the LED module is coupled to the frame and the bracket, at least one of the plurality of third coupling members is coupled to the first coupling member by a magnetic force and at least another of the plurality of third coupling members is coupled to the second coupling member by a magnetic force, and
wherein the cover plate is configured to be mounted to the frame by moving the cover plate into the frame, from a front of the frame, and to be separated from the frame by moving the cover plate out of the frame, at the front of the frame.

12. The display module of claim 11, wherein the bracket and the circuit part are disposed to be accessible from the front of the frame.

13. A display apparatus comprising a plurality of display modules and a support to support the plurality of display modules,
wherein each of the display modules comprises:

a frame;
a light emitting diode (LED) module configured to be detachably mounted to the frame; and
a coupling protrusion configured to be coupled to the frame,
wherein the support comprises a coupling hole, including a groove elongated in an oblique direction, that is within a plane orthogonal to a forward direction of the display apparatus and that is oblique relative to a vertical direction that is within the plane, such that the coupling protrusion is inserted into the groove of the coupling hole in the oblique direction within the plane,
a width of an end of the groove is larger than a diameter of the coupling protrusion such that the groove is configured to receive the coupling protrusion, and a width of another end of the groove is smaller than the diameter of the coupling protrusion, and
the end of the groove, that has the width larger than the diameter of the coupling protrusion, is an open end of the coupling hole that is open to an outside of the support in a direction opposite to the oblique direction.

14. The display apparatus of claim 13, wherein at least one of the display modules is configured to be coupled to the support or be separated from the support while the LED module is mounted to the frame.

15. The display apparatus of claim 13, wherein the coupling protrusion comprises:
a flange disposed in contact with a first surface of the support; and
a moving part disposed in contact with a second surface of the support, the second surface being opposite to the first surface of the support, and configured to be reciprocally movable within a predetermined range.

16. The display apparatus of claim 15, wherein the coupling protrusion further comprises an elastic member disposed between the flange and the moving part, and
wherein, when the coupling protrusion is inserted into the coupling hole, the elastic member provides an elastic force to the moving part such that the moving part moves toward the second surface.

17. The display apparatus of claim 15, wherein the moving part comprises a guide surface that is inclined to guide the coupling protrusion while the coupling protrusion is inserted in to the coupling hole.

* * * * *